(12) United States Patent
Veland

(10) Patent No.: US 9,297,377 B2
(45) Date of Patent: Mar. 29, 2016

(54) SEALING SYSTEM DEVICE

(75) Inventor: Arne Veland, Bergen (NO)

(73) Assignee: FRAMO ENGINEERING AS, Bergen (NO)

( * ) Notice: Subject to any disclaimer, the term of this patent is extended or adjusted under 35 U.S.C. 154(b) by 1800 days.

(21) Appl. No.: 12/441,227

(22) PCT Filed: Oct. 12, 2007

(86) PCT No.: PCT/NO2007/000358
§ 371 (c)(1),
(2), (4) Date: Jan. 13, 2010

(87) PCT Pub. No.: WO2008/115064
PCT Pub. Date: Sep. 25, 2008

(65) Prior Publication Data
US 2010/0150740 A1   Jun. 17, 2010

(30) Foreign Application Priority Data

Oct. 13, 2006 (NO) .................................. 20064648

(51) Int. Cl.
*F04B 35/04* (2006.01)
*F04B 53/16* (2006.01)
(Continued)

(52) U.S. Cl.
CPC ............ F04B 53/164 (2013.01); F04D 29/108 (2013.01); F16J 15/406 (2013.01); *F16J 15/40* (2013.01)

(58) Field of Classification Search
CPC ........ F04B 49/007; F04B 49/02; F04B 49/03; F04B 49/035; F04B 49/22; F04B 49/24; F04B 49/08; F04B 47/00; F04B 2205/05; F04B 2205/06; F04B 2205/07; F04B 53/20; F04B 53/08; F04B 53/164; F16J 15/006; F16J 15/164; F16J 15/406; F16J 15/3456; F16J 15/182; F16J 15/14; F16J 15/40; F16J 15/48
USPC ............ 417/53, 423.3, 423.8, 423.9, 423.11, 417/372, 307; 277/431, 432
See application file for complete search history.

(56) References Cited

U.S. PATENT DOCUMENTS 5,207,291 A * 5/1993 Mezzedimi et al. ......... 184/6.16
5,209,495 A * 5/1993 Palmour ....................... 277/500
(Continued)

FOREIGN PATENT DOCUMENTS

EP   1 420 167 A2   5/2004
GB   2 410 987 A    8/2005
(Continued)

OTHER PUBLICATIONS

"Centrifugal pumps for General Refinery Services" American Petroleum Institute. Washington, D.C., Jan. 1981, pp. 39, 42, 43.

*Primary Examiner* — Devon Kramer
*Assistant Examiner* — Amene Bayou
(74) *Attorney, Agent, or Firm* — Merchant & Gould P.C.

(57) ABSTRACT

The present invention relates to a dynamic sealing system device for a submerged pump comprising at least one feed line running in towards the dynamic sealing system, with a first valve device arranged in the feed line and a second valve device arranged such that in an open position it opens a first bypass line that runs from a point on the feed line between the first valve device and the pump and a low-pressure source at the pump to reduce the pressure in a barrier fluid in the sealing system. The invention also comprises a method for reducing the barrier fluid pressure for a submerged pump.

17 Claims, 6 Drawing Sheets

(51) Int. Cl.
*F04D 29/10* (2006.01)
*F16J 15/40* (2006.01)

(56) References Cited

U.S. PATENT DOCUMENTS

| | | | |
|---|---|---|---|
| 5,213,159 A | | 5/1993 | Schneider |
| 5,217,234 A | * | 6/1993 | Hornsby ................ 277/408 |
| 5,372,730 A | * | 12/1994 | Warner et al. ............ 210/791 |
| 5,484,267 A | * | 1/1996 | Rockwood ............... 417/53 |
| 5,746,435 A | * | 5/1998 | Arbuckle ................ 277/304 |
| 5,769,427 A | * | 6/1998 | Ostrowski .............. 277/318 |
| 5,906,374 A | * | 5/1999 | Arbuckle ................ 277/304 |
| 6,082,737 A | * | 7/2000 | Williamson et al. ...... 277/317 |
| 6,116,609 A | | 9/2000 | Azibert |
| 6,158,967 A | * | 12/2000 | Dupre ..................... 417/53 |
| 6,161,835 A | * | 12/2000 | Arbuckle ................ 277/320 |
| 7,191,871 B2 | * | 3/2007 | Nakai et al. ............. 184/6.5 |
| 7,469,748 B2 | * | 12/2008 | Ocalan et al. ........... 166/372 |

FOREIGN PATENT DOCUMENTS

| WO | WO 92/00438 | 1/1992 |
|---|---|---|
| WO | WO 96/10707 | 4/1996 |

* cited by examiner

SEALING SYSTEM DEVICE

This application is a National Stage Application of PCT/NO2007/000358, filed 12 Oct. 2007, which claims benefit of Serial No. 20064648, filed 13 Oct. 2006 in Norway and which applications are incorporated herein by reference. To the extent appropriate, a claim of priority is made to each of the above disclosed applications.

The present invention relates to a device for a barrier fluid sealing system for a pump unit, and to a method for controlling the pressure in this barrier fluid sealing system.

Pumps of the single-phase, two-phase and multiphase types are widely used in connection with petroleum recovery, and these pumps may in some cases be located under water. The pumps are used for several purposes as, for example, to build pressure for injection of water in a water injection well, or to lift produced fluid from the well. This may be particularly relevant in a declining phase of the service life of the well, as the well pressure may be reduced. Petroleum recovery is also taking place at increasingly greater depths, and this means ever more stringent demands on the equipment that is to be located on a subsea installation. Pumps are a common feature of such a subsea installation.

In general, pumps are intended to increase the pressure in a fluid from a suction side pressure to a delivery pressure. A barrier fluid sealing system in connection with the pump must be adapted to the pressures on the suction and delivery sides of the pump or, in other words, the working pressures of the pump. The barrier fluid will normally be delivered to the pump at a certain overpressure relative to the suction and delivery pressures. This overpressure should lie within given limits, for example, 10-70 bar above the working pressure, and should not lie above or below this set range, as this would result in inadequate sealing or excessive consumption of barrier fluid.

There are a number of challenges in this regard. One challenge is that the suction and delivery pressures will in general vary slightly, and they may also change during the service life of a pump. In the case of pumps used in connection with petroleum recovery, there may be several factors that result in changed working conditions for the pump. There may be a stoppage in production from the well, which can cause a build-up of pressure in the systems, for example by a build-up of gas pockets. The actual reservoir pressure may fall over time, or there may be a change in the fluid that is produced, for example, an increase in the amount of gas over time, which results in changed pressure conditions, etc.

This means there is a need to have a dynamic barrier fluid sealing system, where the pressure in the barrier fluid sealing system responds to the working conditions of the pump. The applicant provides systems of this type where a subsea pump is supplied with barrier fluid from a system on an installation above water. The barrier fluid system above water comprises a fluid source having a given maximum pressure which supplies fluid to a feed line that leads down to the subsea pump. The fluid source may, in such a case, comprise a barrier fluid tank with a pump that pressurises the barrier fluid from the tank to the maximum pressure desired and delivers the fluid into the feed line of the barrier fluid system. A first valve is located in the part of the feed line that is above water. This first valve can be opened to initiate an increase in pressure in the barrier fluid system, through a supply of barrier fluid at the maximum pressure desired in the system. A second valve is arranged after the first valve in connection with the feed line above water. This second valve has the function that it can be opened to reduce the pressure in the barrier fluid circuit, in that it opens a fluid line between the feed line after the first valve and a system tank. The system tank has normal atmospheric pressure, and will therefore function as a pressure relief tank. This results in a dynamic barrier fluid sealing system that can be adjusted continuously or at intervals in relation to the actual working pressure conditions of the pump. This is a system that works extremely well for subsea pumps that are not located at great depths, but may cause problems at greater depths. If there are several subsea pumps, each pump with a barrier fluid control system of this type must also have its own control system for the pressure in the barrier fluid above water and one feed line per pump running from this surface installation down to the subsea pump. This is a relatively costly solution.

However, petroleum recovery is being carried out at increasingly greater depths with an increasing distance between the pump and the surface installation. As mentioned, this results in a number of challenges. The longer distance between the surface control system and the subsea pump results in a system that has a relatively long response time. Another factor is that at greater depths the static pressure of the fluid barrier column on the pump will in some cases be too high, that is to say that there is too great a difference between the pressure on the produced fluid and the pressure in the barrier fluid; this applies in particular to the suction side of the pump. Thus there may be a situation where the lowest pressure in the barrier fluid, which is the static pressure of the barrier fluid at the pump, is in certain cases too high in relation to the working pressure conditions of the pump.

One of the objects of the present invention is to provide a barrier fluid sealing system device for a pump which solves the aforementioned challenges, and which provides good operating conditions for the pump. It is also an object to provide a solution which to a greater degree is independent of the static pressure of the barrier fluid at the pump. Another object is to provide a device which has a shorter response time than previously known systems, in particular for pumps in deep water. It is also a further object to provide a solution involving a simplified system for controlling the barrier fluid pressure for a plurality of subsea pumps.

The aforementioned objects are achieved by means of a device and a method according to the claims below.

The present invention relates to a dynamic sealing system device for a preferably submerged pump. The pump is connectable to a process fluid conduit by a, in relation to the pump, process inlet line and a process outlet line in order to increase the pressure in a fluid flowing through the pump between the inlet and the outlet of the pump. The pump is preferably submerged, for example, in the sea, and is located in connection with a subsea installation.

The pump comprises both a pressure booster for increasing the pressure in the fluid flowing through the pump and a motor for driving the pressure booster, with means for connection of the necessary devices for supplying the required energy and controlling the pump. This will be understood by a person of skill in the art.

The dynamic sealing system is a barrier fluid operated system, where barrier fluid is supplied to the relevant seals, which may be dynamic seals or static seals between respectively two relatively moving parts or relatively static parts of the pump, in order to obtain a sealing function between them. The sealing system comprises means for connection to a supply of barrier fluid and for distribution of the barrier fluid to the seals in question.

The device according to the invention comprises a feed line for feeding a barrier fluid from a barrier fluid source to the sealing system. The barrier fluid source will, in the case of subsea pumps, normally be a barrier fluid source located above water, preferably on a surface installation, but it is also conceivable, for example, to have a barrier fluid source located in proximity to the pump under water, or that the barrier fluid is the fluid in which the pump is submerged, i.e., the water. The barrier fluid source supplies barrier fluid to the device at the greatest pressure envisaged for the barrier fluid in the sealing system, that is to say, a barrier fluid pressure adapted to the greatest working pressure at which the pump is to work. A barrier fluid source will normally comprise a tank of barrier fluid and a pump which pressurises the barrier fluid to the required maximum pressure that is desired in the system, and delivers this fluid into the feed line. A first valve device is arranged forward of the point of entry of the feed line into the sealing system. This first valve device may, in one embodiment, be located in proximity to the pump, for example, at approximately the same static pressure as the pump. In an alternative embodiment, this first valve device may be located at a point where the desired static pressure is downstream of the first valve device. This first valve device is arranged to open or close the feed line for supplying pressure in the sealing system. This pressure corresponds to the maximum pressure desired in the barrier fluid circuit.

This maximum pressure in the barrier fluid circuit is often far too high to be employed directly in the sealing system and must therefore be adjusted in relation to the desired level. For subsea pumps at great depths, any static pressure in any barrier fluid line running to the surface would also be so high that such a solution could not be used to adjust the pressure in the barrier fluid circuit down to a lower minimum value for the pressure in the sealing system.

According to the invention, this is solved by a second valve device which is so arranged that in an open position it opens a first bypass line which runs from a point on the feed line between the first valve device and the pump and an opening in towards the produced fluid that flows through and is pressurised by the pump. This opening is preferably arranged on the suction side of the pump near the process inlet line of the pump. The pressure in the produced fluid will normally be lower than the pressure desired in the barrier fluid, and the process inlet line, in particular, will always have a pressure lower than the pressure desired in the barrier fluid in the pump sealing system.

The device also comprises a control unit with means for receiving the actual working pressure conditions around the pump, the first and second valve devices being connected to the control unit, and the control unit controlling the valve devices in accordance with the working pressure conditions of the pump. The control unit may be located near the pump or at a remote location. It may be self-regulating and/or receive signals from an operator or operation unit.

Such a sealing system device results in a sealing system that has a very short response time from the occurrence of changes in the working pressure conditions for the pump until the sealing system is adjusted in relation thereto. This is obtained in that the control system is arranged close to the pump submerged in the water. This also gives a sealing system where there is always an available pressure source having a pressure lower than that desired in the sealing system, so that barrier fluid can always be dumped into this pressure source. This gives a sealing system in which there may be a barrier fluid pressure in the sealing system at a pressure much lower than a static pressure for the barrier fluid in situ. Such a sealing system is thus independent of the water depth at which the pump is located and the static pressure in the barrier fluid at the pump.

For a plurality of subsea pumps, this also allows the option of having only one feed line running from the surface where the barrier fluid source is located down to the location of the pumps, where a device according to the invention may be provided for each subsea pump. The pressure in the barrier fluid in the sealing systems for the pumps may be adjusted for each pump separately, thus allowing the one feed line to have a pressure corresponding to the maximum pressure envisaged for all the pumps. Having only one feed line provides huge savings in costs since in this case only one barrier fluid supply system is needed above water for supplying barrier fluid at one pressure, and there is only one feed line instead of one feed line per pump, which is a cost-saving solution both in connection with installation and also during use.

According to one aspect of the invention, it further comprises a third valve device. This third valve device has several positions, but in an open position it will open a second bypass line that runs between a point on the feed line ahead of the first valve device and the process inlet line. This permits the introduction of barrier fluid pressure into the suction side of the pump independent of regulation of the first and second valves as a rapid response in the event the pressure here falls quickly. In one embodiment of the invention, the second valve device may be connected to the second bypass line between the third valve device and the process inlet line, and arranged such that in one position it opens the first bypass line and closes the second bypass line, and in a second position it closes the first bypass line and keeps the second bypass line open. An arrangement of this kind ensures that the second and third bypass lines are not open at the same time.

In one embodiment, at least one accumulator is attached to the feed line between the first valve device and the pump. The attachment of an accumulator provides some flexibility in the system, and if several accumulators are attached, these may be precharged at different pressures. At least one nozzle means is also preferably arranged in the feed line, between the first valve device and the pump and/or the process inlet line. The arrangement of a nozzle in the feed line provides a smoothing out of any pressure pulses in the system as these nozzles choke the line and thus smooth out the pressure pulse after the nozzle. Pressure pulses may, for example, be created when the first valve device is opened for supply of pressure in the system.

According to a further aspect of the invention, the device can provide a connection between the barrier fluid feed line and a cooling system for the pump, thereby enabling the barrier fluid to be used as a cooling fluid. In one such embodiment, the cooling system may be provided with a circulation impeller which is connected to a motor shaft so that the speed of the circulation impeller is controlled directly by the rotation of the motor shaft. In one embodiment, at least one cooling unit and at least one filter unit may be provided in the circuit for the barrier fluid that is to be used as a cooling fluid. In one embodiment, a cooling unit may be arranged in parallel with a filter unit, and an arrangement of this kind will allow outlet to the second valve device to be arranged downstream of the filter unit, the fluid that is led towards this valve thus being filtered.

The invention also comprises a method for reducing the barrier pressure in a sealing system for a pump, with a barrier fluid feed line between a source of barrier fluid and the pump, and where in the feed line in proximity to the pump there is arranged a first valve device and a second valve device is provided between the first valve device and the pump, the second valve device connecting a bypass line between the feed line and the process fluid conduit of the pump. According to the invention, the first valve device is put in a closed state so that the feed line is shut off, the second valve is opened so that an open passage is obtained via the bypass line between the feed line and the suction side of the pump, and barrier fluid is bled off to the suction side of the pump.

The invention will now be explained in more detail with reference to the attached drawings, wherein.

Figure 1:
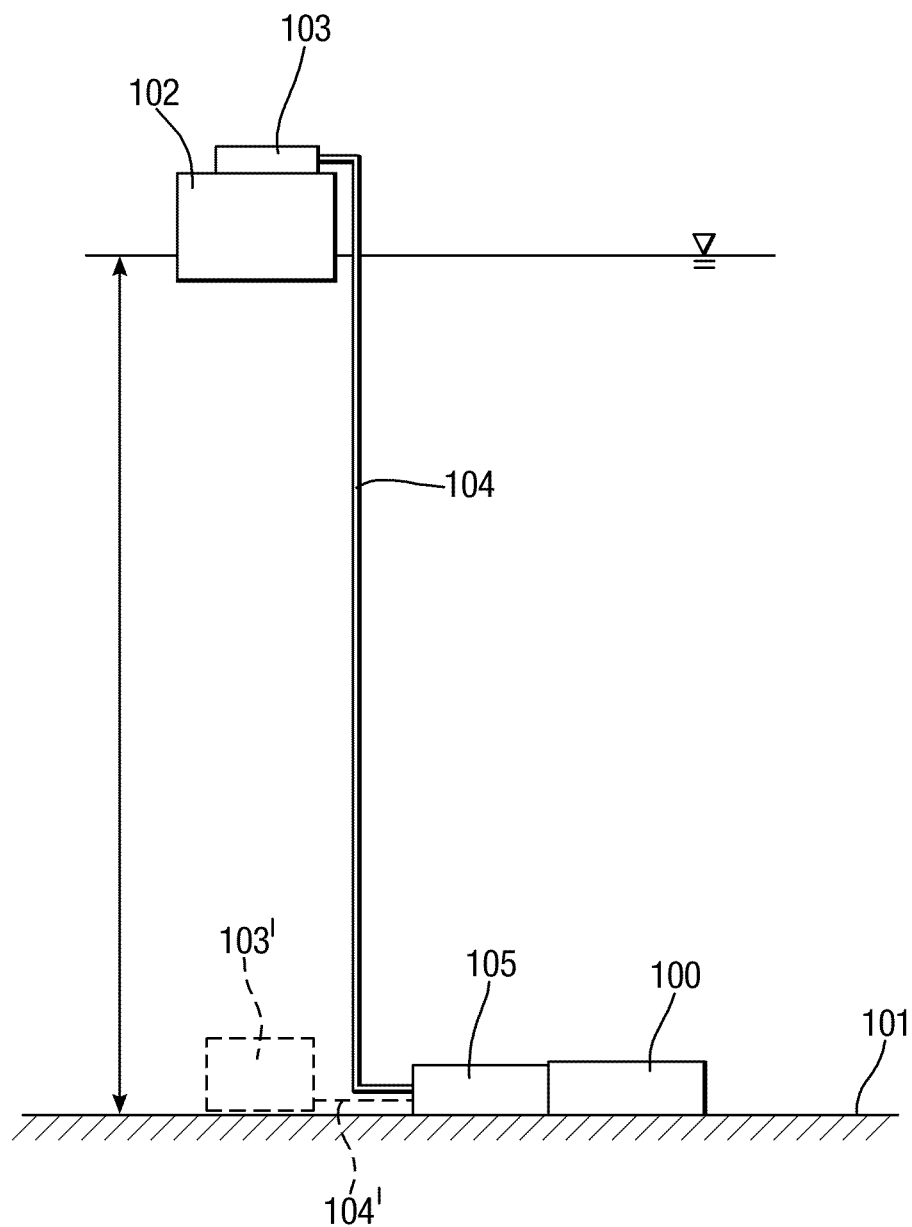
FIG. 1 is a basic diagram of a possible application of the invention.

The present invention relates to a dynamic sealing system device for a pump. A possible application is shown in FIG. 1, where a pump 100 is located submerged on a seabed 101, and where the device 105 according to the invention is located in connection with the pump 100. The device 105 can be supplied with a barrier fluid from a barrier fluid source 103 arranged on a surface installation 102 which is provided at the surface of the fluid in which the pump 100 is submerged. A line 104 is arranged between the barrier fluid source 103 and the device 105. Alternatively, the device 105 may receive a supply via line 104' from a barrier fluid source 103' arranged near the pump 100.

Figure 2:
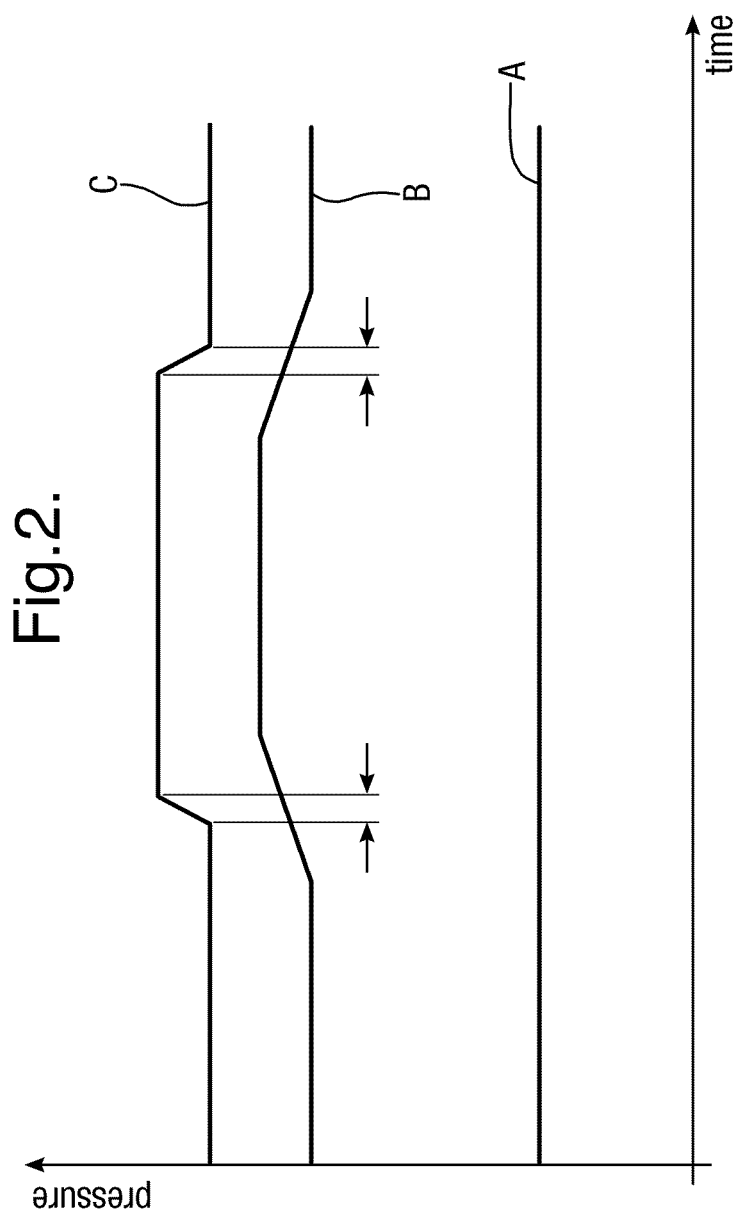
FIG. 2 is a process diagram for indication of the control of the device according to the invention in relation to a process fluid pressure in the pump.

The device according to the invention permits control of the pressure in the barrier fluid C that is supplied to the seals in a pump in accordance with the pressure in the process fluid. FIG. 2 shows an option where the process inlet pressure A for the pump is constant, but where for a period it is desirable to have a higher process outlet pressure B from the pump and where the barrier fluid pressure C, in response to an increase in the process outlet pressure, increases (the increase portion of the graphs), and where it subsequently decreases as a result of a decrease in process outlet pressure (the decrease portion of the graphs). In this way, it is ensured that the pressure differential between the barrier fluid pressure and the process fluid pressure in the pump is kept within an acceptable range, that is to say that the pressure differential does not become too great or too small.

Figure 3:
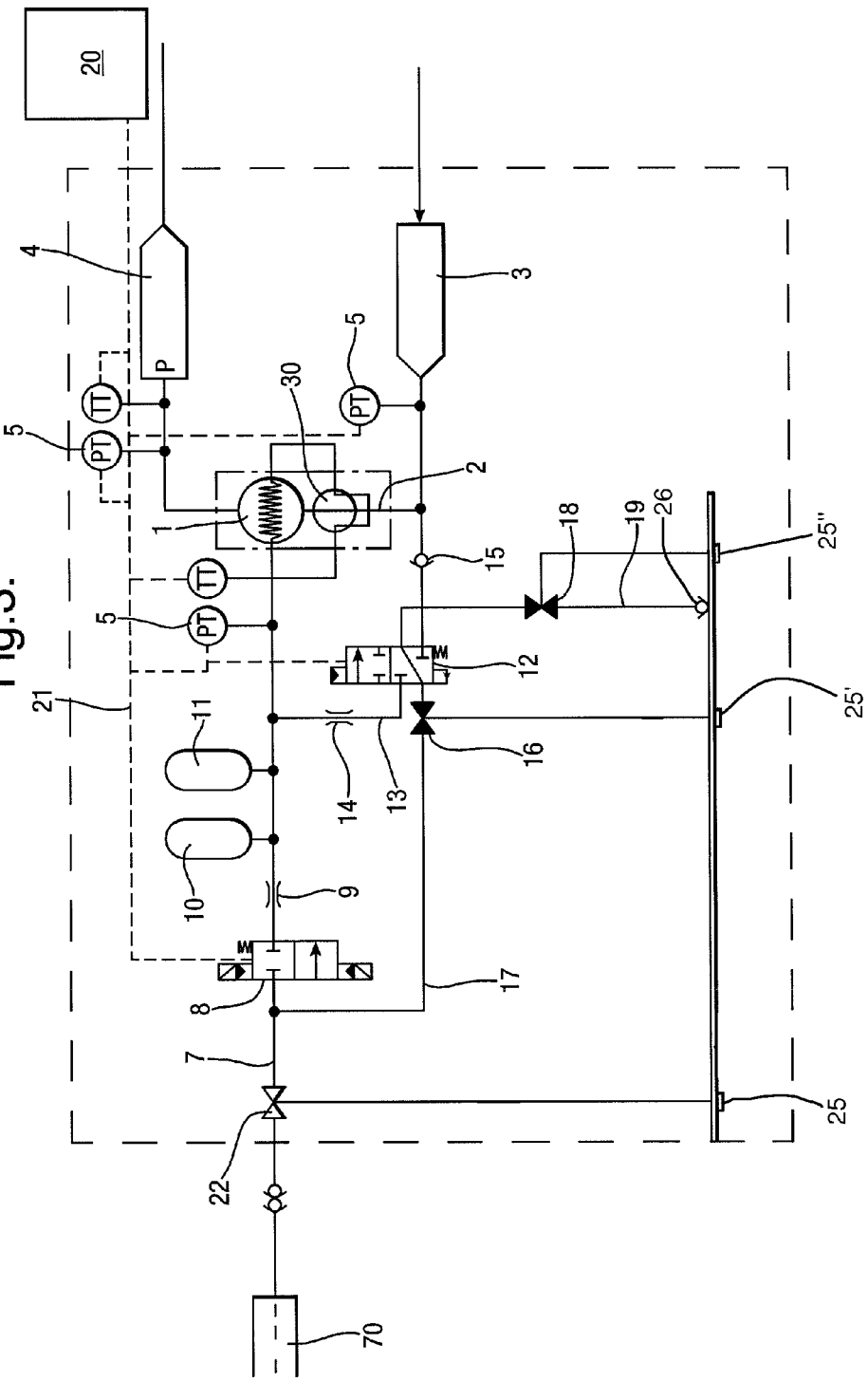
FIG. 3 shows an application of the invention.

FIG. 3 shows an embodiment of the device according to the invention. A pump 1 is connected to a process fluid line 2 and has a process fluid inlet 3 and a process fluid outlet 4. The sealing system in the pump 1 is supplied with barrier fluid through a feed line 7 from a barrier fluid source 70, shown schematically. This source may be a separate source near the pump, or at the surface or it may be the fluid in which the pump is submerged.

A first valve device 8 is arranged in the feed line 7, in proximity to the pump 1. This first valve device 8 has two positions, an open and a closed position, so that a supply of barrier fluid may be admitted or shut off at a greatest pressure envisaged in the barrier fluid system for the pump. This pressure will thus be given by the maximum pressure at which the pump is to deliver plus the pressure differential desired between process pressure and barrier fluid pressure. Further arranged between the first valve device 8 and the pump 1 is an admission nozzle 9 to smooth out any pressure pulses in the system. Two accumulators 10,11 are also provided which may be pre-charged at different pressures. Further arranged at the inlet of the feed line 7 towards the pump 1 is a pressure reader 5, and pressure readers 5 are also provided at the process inlet and the process outlet of the pump. These are connected to a control unit 20 for controlling the device according to the invention. The control unit 20 comprises connections 21, indicated by exemplary broken lines in FIG. 3, to the relevant parts of the system from which it receives information and is to control, such as valves, pressure sensors etc. This control unit 20 may be arranged near the pump or at the surface installation.

In the system there is further arranged a second valve device 12 which has at least two positions, where in one position it opens a first bypass line 13 which connects a point on the feed line 7 between the first valve device 8 and the pump 1, to the process inlet line 3 of the pump. In this first bypass line 13 there are also arranged a bypass nozzle 14 and a one-way valve 15 which opens from the bypass line 13 towards the process inlet line 3. This second valve device 12 has a second position in which it closes the bypass line 13.

Furthermore, there is a second bypass line 17 which connects a point on the feed line 7 ahead of the first valve device 8 to the process inlet line 3, via the second valve device 12 which, in the position wherein it closes the first bypass line 13, opens the second bypass line 17. At the same time, forward of this connection to the second valve device 12 there is arranged a third valve device 16 for closing and opening the second bypass line 17. This may be necessary in the cases where it is desirable to increase the pressure on the suction side of the pump in the event of a rapid fall in pressure in the process fluid inlet 2.

In the system there is also a third bypass line 19 with a fourth valve device 18, which third bypass line 19 is connected between a point on the first bypass line 13, between the second valve device 12 and the process inlet 3, and a connection device comprising a one-way valve 26 for connection to a second fluid source, for example, with the aid of a remotely operated vehicle (ROV). The system also comprises a fifth valve device 22 arranged in the feed line 7 ahead of the first valve device 8 as a safety valve, which is normally open but can be closed with the aid of the valve control device 25 and, for example a remotely operated vehicle (ROV). There are similar devices 25', 25" for the third and fourth valve devices 16, 18.

Figure 4:
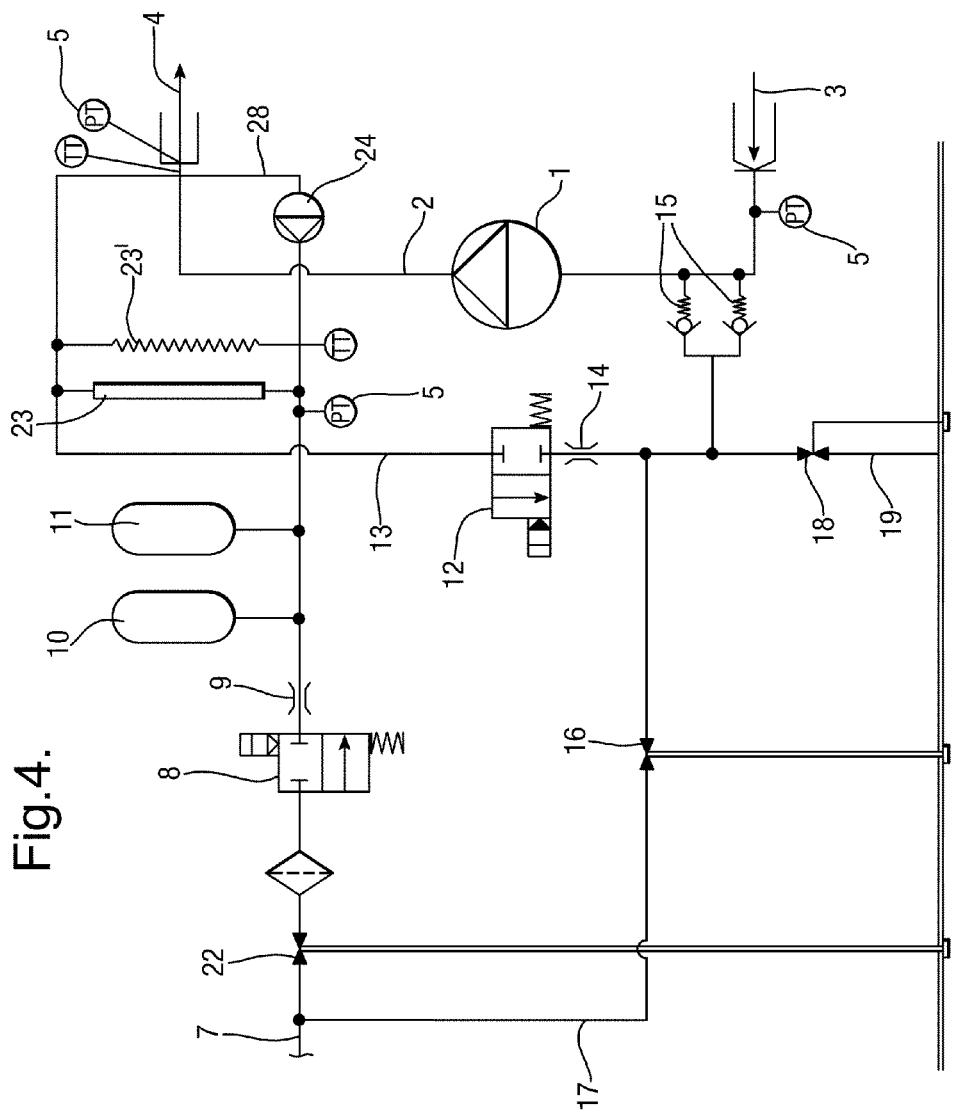
FIG. 4 shows a second application.

FIG. 4 shows an alternative embodiment of the invention as shown in FIG. 3. The same elements have been given the same reference numerals and only the parts not found in the previously explained embodiment will be explained. For the other elements reference is made to the explanation above. In this embodiment a branch of the first bypass line 13 is shown running in towards the process inlet 3 to the pump 1, where a one-way valve 15 is arranged in each of the branches. In this embodiment, the second valve device 12 is located so that it only controls the first bypass line 13 and is not connected directly to the second bypass line.

Furthermore, filter units 23 and cooling units 23' connected in a side branch 28 have been introduced in this embodiment. A circulation impeller 24 is also arranged in this side branch 28. The circulation impeller 24 sets the barrier fluid in circulation so that any accumulated heat in the system can be cooled away by means of the circulation of the barrier fluid. The rotation of the circulation impeller 24 can be linked to the rotational shaft of the motor 30 which drives the pump 1. The filter unit 23 is also introduced so that the circulated barrier fluid is filtered at regular intervals as well.

Figure 5:
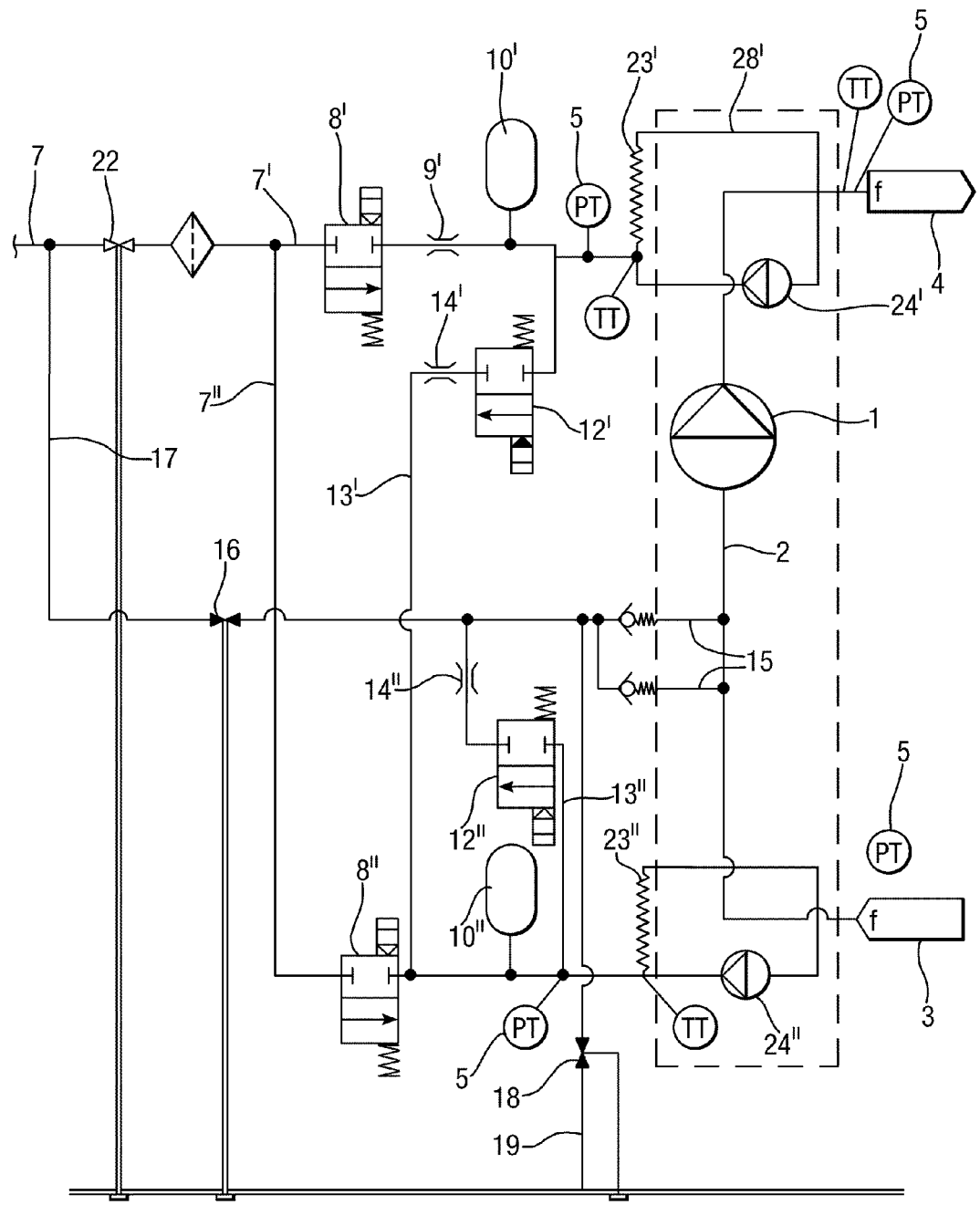
FIG. 5 shows a third application.

FIG. 5 shows an alternative embodiment of the device according to the invention. In this case, the device comprises systems such that it is possible to have different barrier fluid pressure on the suction side and the outlet side of the pump. This may be necessary, for example, in the case where there is a huge increase in pressure across the pump. As shown in the figure, the device comprises a feed line 7 which splits into two lines 7', 7" running in towards two separate first valve devices 8',8". The feed lines 7', 7" further comprise, as described above, a respective nozzle 9', 9", accumulator 10', 10", and a first bypass line 13', 13", which each comprise second valve devices 12', 12" and bypass nozzles 14', 14". Running in towards the seals around the process outlet 4 from the pump 1 there is a side branch 28' connected to a circulation impeller 24' and a cooling unit 23', so that the barrier fluid around the process outlet can be circulated and act as a coolant. A corresponding side branch 28" with cooling unit 23" and circulation impeller 24" is found in connection with the seals around the process inlet 3.

The device is further formed so that the first bypass line 13' associated with the outlet side of the pump 1, is connected to the feed line 7" after the first valve device 8" associated with the inlet side of the pump 1. This is because the barrier pressure on the inlet side of the pump will normally be at a lower pressure than the outlet side of the pump so that the inlet side can be used to dump pressure from the outlet side if necessary. This bypass line 13' could, in one alternative, be connected so that it leads directly in towards the process inlet 2 via one-way valves 15. Otherwise, there are systems like those described earlier, only so that it is possible to operate at different pressure levels in towards the inlet side and the outlet side of the pump 1.

In this embodiment, it is also shown that it is possible to have one feed line that leads down to a plurality of pumps which are operated at different pressure levels and that there may be a plurality of pumps with a need for different barrier fluid pressure on the inlet and the outlet side of the pumps and that this can be provided by one feed line from a fluid source and with devices according to the invention connected to each pump or to each side of the pumps.

Figure 6:
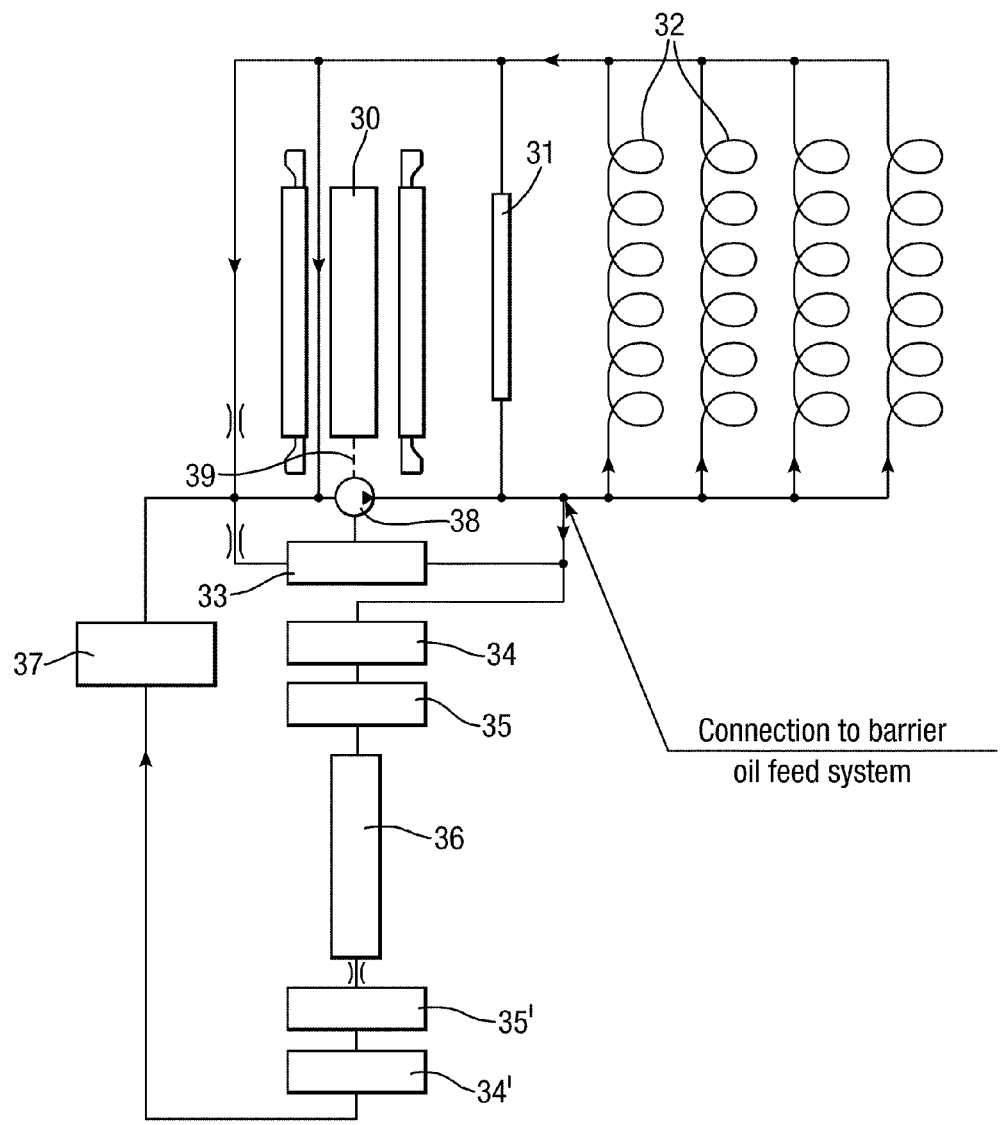
FIG. 6 shows the principle where devices are connected to a cooling system.

As mentioned above, the barrier fluid used in the device according to the invention is used as a coolant and a possible embodiment of this is indicated in FIG. 6. The system as shown in FIG. 6 receives a supply of barrier fluid from a system as described above, and this fluid is used as a cooling system for motor, seals and pump in that a circulation impeller 38 is provided in the fluid circuit. This may be similar to the circulation impellers 24, 24', 24" in the previous embodiments. Further indicated in the circuit are a motor 30 through which the barrier fluid is passed, bearing 33, radial bearing 34, 34', mechanical seals 35, 35' and the pump impeller 36 and a flexible gear connection 37. The barrier fluid in the circuit will carry away heat from all these parts, after which it is passed through cooling units 32 and/or filter unit 31 for cooling and/or filtration of the barrier fluid. These cooling and filter units 32, 31 are like the filter units 23 and cooling units 23' in FIG. 4. The circulation impeller 38 is connected to the motor shaft 39 so that it is driven by the rotation of the motor shaft 39, which gives a well balanced cooling of the elements in the system.

The device according to the invention has now been explained using a plurality of exemplary embodiments. A person of skill in the art will understand that modifications and alterations of these embodiments may be made which fall within the scope of the invention as defined in the claims below. The first valve device may, for example, be located submerged but at a different static pressure than the submerged pump.

The invention claimed is:

1. A device for a dynamic sealing system for a pump connectable to a process fluid conduit by a process inlet line and a process outlet line for pressurising a process fluid, comprising at least one feed line running from a barrier fluid source toward the dynamic sealing system, wherein the dynamic sealing system comprises a first valve device arranged in the feed line, which is provided to open or close the feed line and a second valve device arranged such that in an open position, the second valve device opens a first bypass line that runs from a point on the feed line between the first valve device and a low pressure point at the pump in order to relieve pressure in a barrier fluid in the sealing system, and a control unit having means for receiving actual working pressure conditions of the pump, where the first and second valve devices are connected to the control unit which controls the first and second valve devices in accordance with the working pressure conditions of the pump, wherein the feed line splits into a first feed line and a second feed line, the first feed line comprises the first valve device and the second feed line comprises a second feed line valve device.

2. A device according to claim 1, wherein the low pressure point is located at the process fluid conduit.

3. A device according to claim 1, wherein the first valve device is located in proximity to the pump.

4. A device according to claim 1, wherein the first bypass line runs from the feed line to the process inlet line.

5. A device according to claim 3, wherein the dynamic sealing system comprises a third valve device, which in one position opens a second bypass line running between a point on the feed line ahead of the first valve device and the process inlet line.

6. A device according to claim 5, wherein the second valve device is connected to the second bypass line between the third valve device and the process inlet line, so that in one position it opens the first bypass line and closes the second bypass line, and in a second position it closes the first bypass line and keeps the second bypass line open.

7. A device according to claim 5, further comprising a fourth valve device which in one position opens a third bypass line from a point on the feed line ahead of the first valve device to the process inlet line.

8. A device according to claim 1, wherein at least one accumulator is attached to the first feed line between the first valve device and the first pump.

9. A device according to claim 1, wherein at least one nozzle is arranged in the first feed line, between the first valve device and the pump and/or the process inlet line.

10. A device according to claim 1, further comprising a connection between the first feed line for the barrier fluid and a cooling system for a motor connected to the pump, so that the barrier fluid can be used as a cooling fluid.

11. A device according to claim 10, wherein arranged in the cooling system is a circulation impeller which is connected to a shaft of the motor so that the speed of the circulation impeller is directly controlled by the rotation of the shaft of the motor.

12. A device according to claim 10, wherein arranged in the bather fluid used as the cooling fluid is at least one filter unit.

13. A device according to claim 12, wherein the cooling system is arranged in parallel with the filter unit.

14. A device according to claim 1, further comprising the pump being submersible, wherein the barrier fluid source is arranged at a surface of fluid in which the first pump is submerged, is submerged in the fluid in which the pump is submerged, or comprises the same fluid in which the pump is submerged.

15. A device according to claim 1, wherein the pump comprises a first pump and a second pump so that the first feed line is configured to be connected to the first pump and the second feed line is configured to be connected to the second pump.

16. A method for reducing barrier pressure in a sealing system for a pump, with a barrier fluid feed line between a source for barrier fluid and the pump and wherein on the feed line there is arranged a first valve device, and a second valve device is provided between the first valve device and the pump, the second valve device connecting a bypass line between the feed line and a process fluid conduit of the pump, wherein the first valve device is placed in a closed state, so that the feed line is shut off and the second valve device is opened so that an open passage is obtained via the bypass line between the feed line and the sealing system and a process inlet of the pump, and the barrier fluid is bled off to the process inlet of the pump.

17. A device for a dynamic sealing system for a submerged pump connectable to a process fluid conduit by a process inlet line and a process outlet line, wherein the submerged pump is configured to pressurize the process fluid, the device comprising at least one feed line running from a barrier fluid source toward the dynamic sealing system, wherein the dynamic sealing system comprises a first valve device arranged in the feed line, wherein the first valve device is configured to open or close the feed line, and a second valve device arranged such that in an open position, the second valve device opens a first bypass line that runs from a point on the feed line between the first valve device and a low pressure point at the pump in order to relieve the pressure of a barrier fluid in the sealing system, and a control unit having means for receiving actual working pressure conditions of the pump, wherein the valve devices are connected to the control unit, wherein the control unit is configured to control the valve devices in accordance with the working pressure conditions of the pump, wherein the first valve device is located in proximity to the pump, and the dynamic sealing system further comprising a third valve device which in one position opens a second bypass line running between a point on the feed line ahead of the first valve device and the process inlet line.

* * * * *